(12) United States Patent
Kuo

(10) Patent No.: US 8,873,907 B2
(45) Date of Patent: Oct. 28, 2014

(54) OPTICAL-ELECTRIC CONVERTING ELEMENT AND OPTICAL-ELECTRIC CONVERTING MODULE

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 40 days.

(21) Appl. No.: 13/740,280

(22) Filed: Jan. 14, 2013

(65) Prior Publication Data

US 2014/0169735 A1   Jun. 19, 2014

(30) Foreign Application Priority Data

Dec. 13, 2012  (TW) .............................. 101147099 A

(51) Int. Cl.
 *G02B 6/32* (2006.01)
(52) U.S. Cl.
 CPC ....................................... *G02B 6/32* (2013.01)
 USPC ......................................................... 385/33
(58) Field of Classification Search
 USPC .................................. 385/24, 30–37, 88, 147
 See application file for complete search history.

(56) References Cited

U.S. PATENT DOCUMENTS

| | | | | |
|---|---|---|---|---|
| 6,985,647 B2 * | 1/2006 | Takamori | ........................ | 385/14 |
| 7,290,946 B2 * | 11/2007 | Yuang | .............................. | 385/93 |
| 7,626,250 B2 * | 12/2009 | Lee et al. | ....................... | 257/675 |
| 7,875,476 B2 * | 1/2011 | Lee et al. | ......................... | 438/30 |
| 8,414,730 B2 * | 4/2013 | Matsuura | ................... | 156/272.2 |
| 8,646,963 B2 * | 2/2014 | Kim | ................................ | 362/631 |
| 2011/0057204 A1 * | 3/2011 | Morioka | ........................ | 257/84 |

* cited by examiner

*Primary Examiner* — Akm Enayet Ullah
(74) *Attorney, Agent, or Firm* — Novak Druce Connolly Bove + Quigg LLP

(57) ABSTRACT

An optical-electric converting element includes a lower surface and a side surface. The lower surface defines a cavity. A bottom portion of the cavity forms at least one first light-gathering coupling lens and at least one first light-emitting coupling lens. A diameter of the at least one first light-receiving coupling lens is equal to d1, and a diameter of the at least one first light-emitting coupling lenses is equal to d2. The side surface perpendicularly connects to the lower surface. The side surface forms at least one second light-receiving coupling lens and at least one second light-emitting coupling lens. A diameter of the at least one second light-emitting coupling lens is equal to d3, a diameter of the at least one second light-receiving coupling lens is equal to d4; wherein d1>d3 and d4>d2.

16 Claims, 5 Drawing Sheets

OPTICAL-ELECTRIC CONVERTING ELEMENT AND OPTICAL-ELECTRIC CONVERTING MODULE

BACKGROUND

1. Technical Field

The present disclosure relates to an optical-electric converting element and an optical-electric converting module.

2. Description of Related Art

An optical-electric converting module usually includes a circuit board, a number of light emitters, a number of light receivers, and a optical-electric coupling member. The light emitters and the light receivers are mounted on and electrically connected to the circuit board. The optical-electric coupling member includes a number of coupling lenses, such as two light-receiving coupling lenses and two light-emitting coupling lenses. Each of the light-receiving coupling lenses aligns with a light emitter, and each of the light-emitting coupling lenses aligns with a light receiver. However, all of the light-receiving coupling lenses and the light-emitting coupling lenses have the same diameter, this may cause the problems of the light-receiving coupling lenses not gathering enough light, and the light-emitting coupling lenses not concentrating enough light.

Therefore, it is desirable to provide an optical-electric converting element and an optical-electric converting module which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
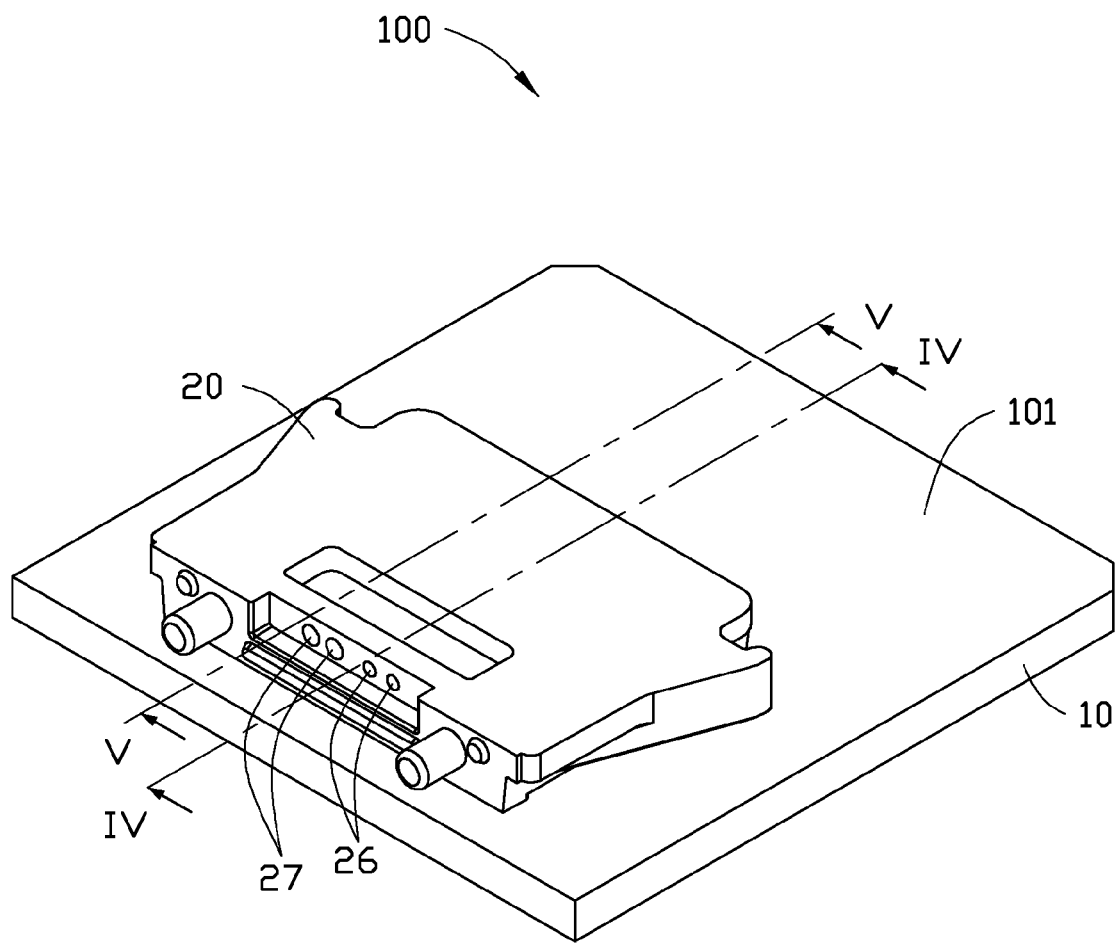
FIG. 1 is an assembled, isometric view of an optical-electric converting module which includes an optical-electric coupling element, according to an exemplary embodiment.
Figure 2:
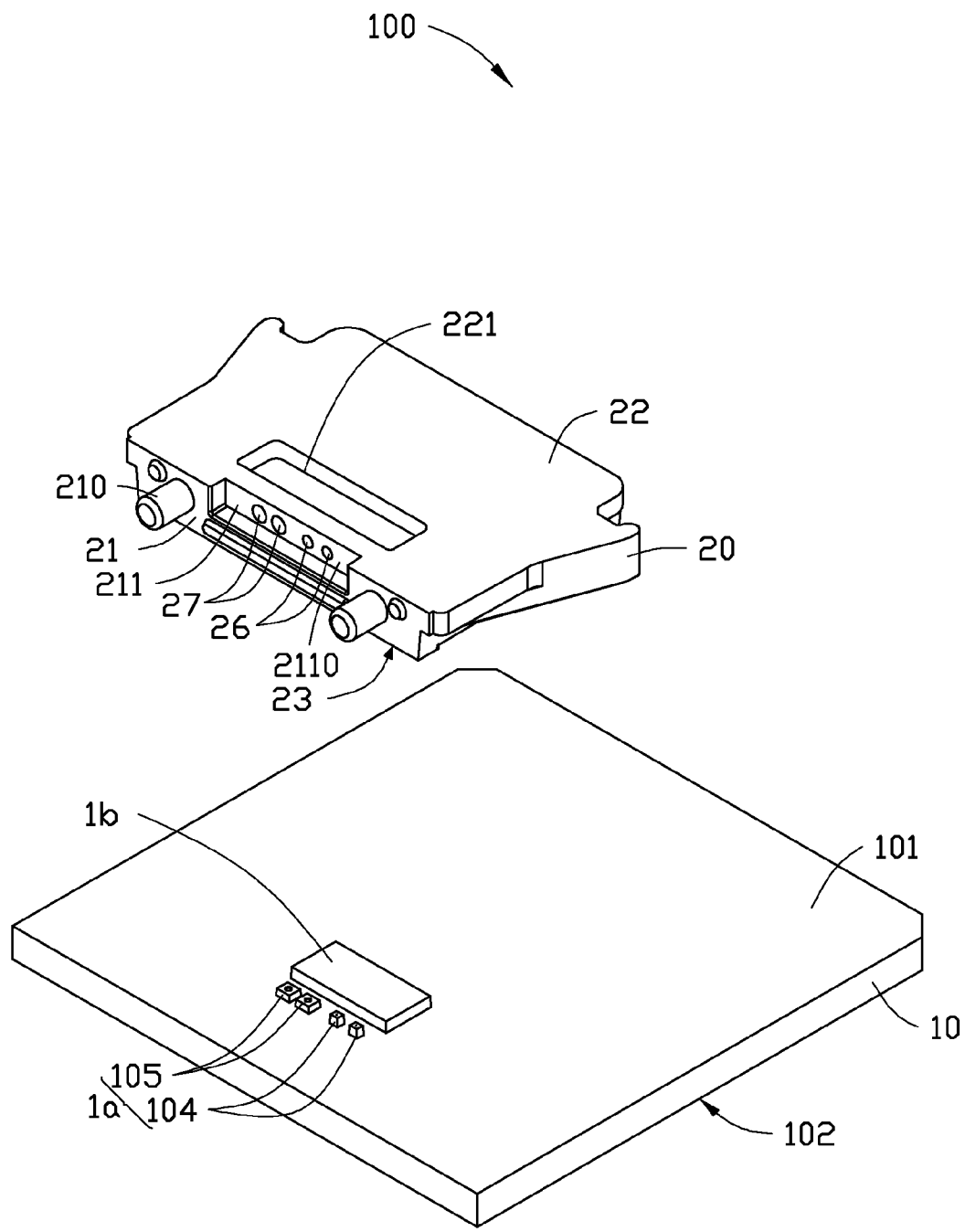
FIG. 2 is an exploded, isometric view of the optical-electric converting module of FIG. 1.
Figure 3:
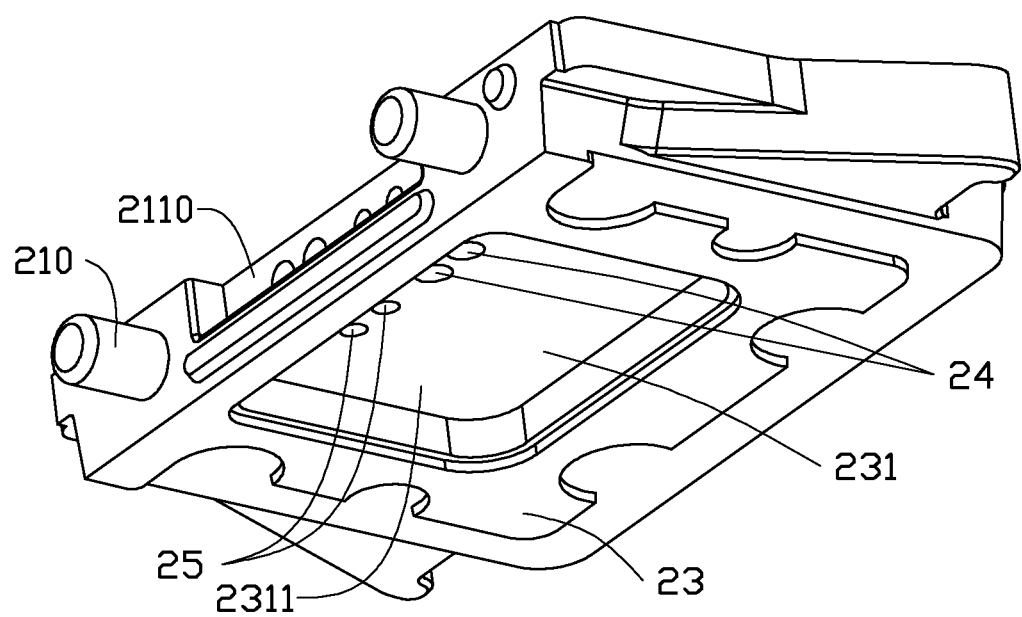
FIG. 3 is an assembled, isometric view of the optical-electric converting element of FIG. 1, but viewed from another angle.
Figure 4:
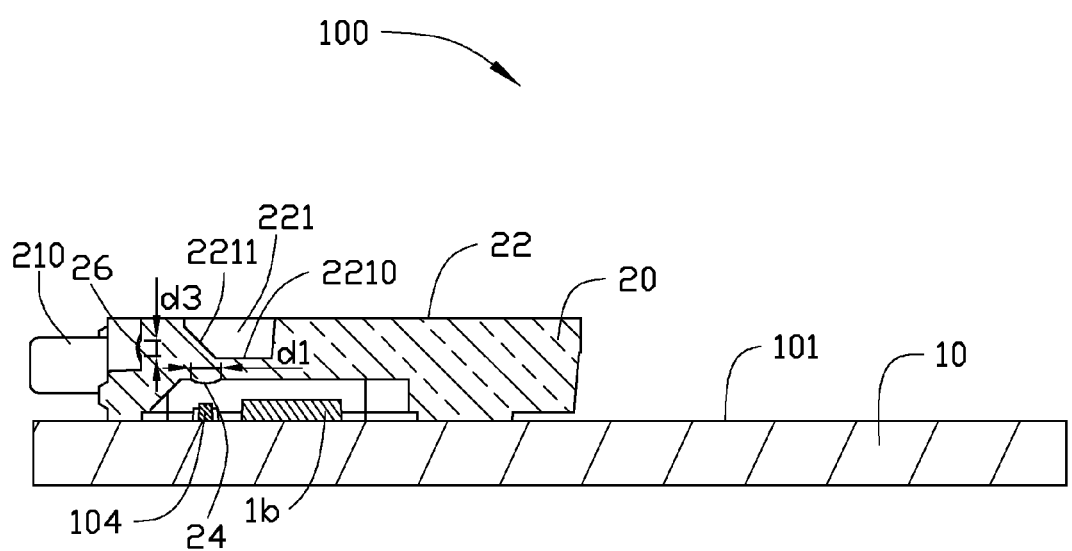
FIG. 4 is a cross-sectional view taken along line IV-IV of FIG. 1.
Figure 5:
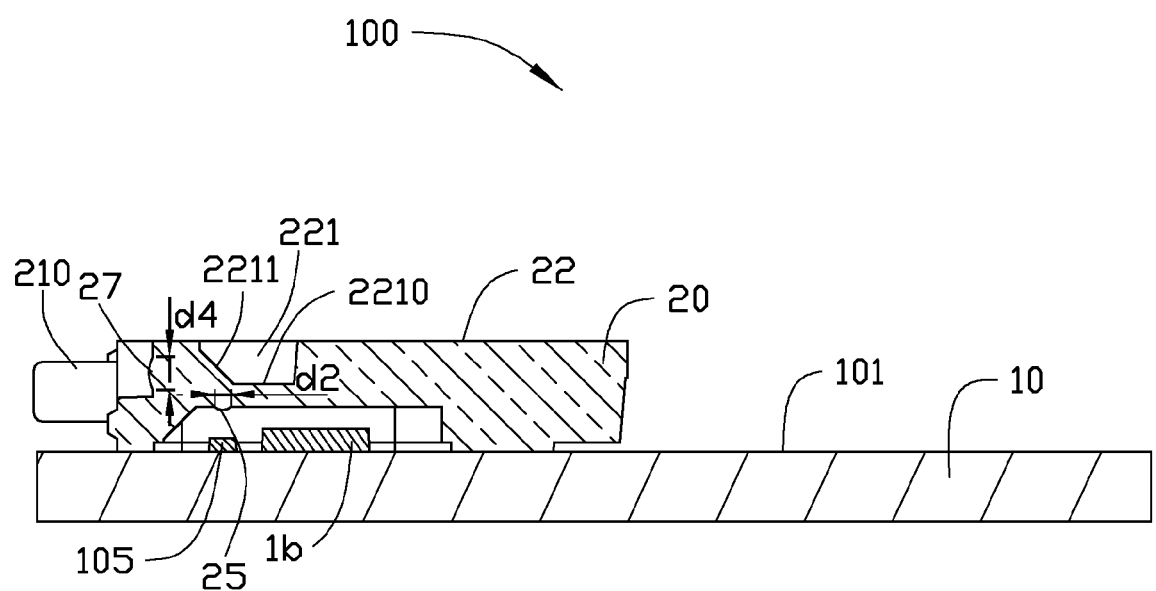
FIG. 5 is a cross-sectional view taken along line V-V of FIG. 1.

FIGS. 1-5 show an optical-electric converting module 100, according to an embodiment. The optical-electric converting module 100 includes a printed circuit board (PCB) 10 and an optical-electric coupling element 20 positioned on the PCB 10.

The PCB 10 includes a supporting surface 101 and a rear surface 102 facing away from the supporting surface 101. Four photoelectric conversion chips 1a, being two laser diodes 104 and two photo diodes 105 for example, are positioned on the supporting surface 101. The PCB 10 contains various circuits (not shown) that connect with the two laser diodes 104 and the two photo diodes 105. The PCB 10 also includes a drive chip 1b configured to drive the laser diodes 104 to emit light, and configured to demodulate the data in the light received by the photo diodes 105.

The optical-electric coupling element 20 includes a first side surface 21, an upper surface 22 and a lower surface 23 facing away from the upper surface 22. The upper surface 22 is substantially parallel with the lower surface 21. The first side surface 21 perpendicularly connects the upper surface 22 and to the lower surface 23.

The optical-electric coupling element 20 defines a first cavity 231 in the lower surface 23. A bottom portion 2311 of the first cavity 231 forms two first light-receiving coupling lenses 24 and two first light-emitting coupling lenses 25. In the embodiment, all of the first light-receiving coupling lenses 24 and the first light-emitting coupling lenses 25 are convex lenses and are integrally formed with the optical-electric coupling element 20. A diameter of the first light-receiving coupling lens 24 is equal to d1, and a diameter of the first light-emitting coupling lenses 25 is equal to d2. In the embodiment, d1>d2. The optical-electric coupling element 20 is positioned on the supporting surface 101, with the two laser diodes 104, the two photo diodes 105 and the drive chip 1b being received in the first cavity 231, such that each of the first light-receiving coupling lens 24 is aligned with a laser diode 104, and each of the first light-emitting coupling lens 25 is aligned with a photo diode 105.

The optical-electric coupling element 20 also defines a second cavity 221 in the upper surface 22. The second cavity 221 includes a bottom surface 2210 and a sloped surface 2211 directly connected to the bottom surface 2210. The bottom surface 2210 is substantially parallel with the upper surface 22. An included angle between the bottom surface 2210 and the sloped surface 2211 is about 45 degrees. An included angle between an optical axis of each first light-receiving coupling lens 24 and the sloped surface 2211 is therefore about 45 degrees. An included angle between an optical axis of each first light-emitting coupling lens 25 and the sloped surface 2211 is also about 45 degrees.

The optical-electric coupling element 20 also defines a receiving cavity 211 in the first side surface 21. The receiving cavity 211 includes a vertical surface 2110 substantially perpendicular to the upper surface 22. The vertical surface 2110 forms two second light-emitting coupling lenses 26 and two second light-receiving coupling lenses 27. In the embodiment, all of the second light-receiving coupling lenses 27 and the second light-emitting coupling lenses 26 are convex lenses and are integrally formed with the optical-electric coupling element 20. Each of the second light-receiving coupling lenses 27 corresponds to a first light-emitting coupling lens 25. Each of the second light-emitting coupling lenses 26 corresponds to a first light-receiving first lens 24. An included angle between an optical axis of each second light-emitting coupling lens 26 and the sloped surface 2211 is also about 45 degrees. An included angle between an optical axis of each second light-receiving coupling lens 27 and the sloped surface 2211 is therefore about 45 degrees.

A diameter of the second light-emitting coupling lens 26 is equal to d3, and a diameter of the second light-receiving coupling lenses 27 is equal to d4. In the embodiment, d4>d3. In the embodiment, d1 is larger than d3, and d4 is larger than d2.

Two locating poles 210 perpendicularly extend from the first side surface 21. In the embodiment, the locating poles 210 are symmetrical about the receiving cavity 211.

In use, light emitted from the two laser diodes 104 is directed into the optical-electric coupling element 20 by the two first light-receiving coupling lenses 24, and the light path is bent about 90 degrees by the sloped surface 2211. In the embodiment, the second light-emitting coupling lenses 26 are positioned on the light path from the sloped surface 2211. The light is thus finally reflected into the two optical fibers (not shown) by the second light-emitting coupling lenses 26. In the embodiment, d1>d3, therefore the first light-receiving coupling lenses 24 can gather enough light, and the second light-emitting coupling lenses 26 can concentrate enough light. A process of the photo diodes 105 receiving light is the reverse of that of the laser diodes 104 emitting light. In the embodiment, d4>d2, the second light-receiving coupling lenses 27 can gather more light, while the first light-emitting coupling lenses 25 can concentrate more light, to significantly improve the light-gathering and the light-concentrating properties respectively of all the lenses.

In other embodiments, the numbers of the laser diodes 104, the photo diodes 105, the first light-receiving coupling lenses 24, the first light-emitting coupling lenses 25, the second light-emitting coupling lenses 26 and the second light-receiving coupling lenses 27 can be changed depending on need.

In other embodiments, the receiving cavity 211 can be omitted from optical-electric coupling element 20, and the first light-receiving coupling lens 24 and the first light-emitting coupling lens 25 be formed directly on the first side surface 21.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical-electric converting element, comprising:
   a lower surface defining a first cavity, the first cavity comprising a bottom portion, the bottom portion forming at least one first light-receiving coupling lens and at least one first light-emitting coupling lens, a diameter of the at least one first light-receiving coupling lens being equal to d1, and a diameter of the at least one first light-emitting coupling lenses being equal to d2; and
   a side surface perpendicularly connecting to the lower surface, the side surface forming at least one second light-receiving coupling lens and at least one second light-emitting coupling lens, a diameter of the at least one second light-emitting coupling lens being equal to d3, a diameter of the at least one second light-receiving coupling lens being equal to d4; wherein d1>d3 and d4>d2.

2. The optical-electric converting element of claim 1, wherein d1>d2 and d4>d3.

3. The optical-electric converting element of claim 1, further comprising an upper surface substantially parallel with the lower surface, wherein the upper surface defines a second cavity, the second cavity comprises a bottom surface and a sloped surface directly connected to the bottom surface, and the bottom surface is substantially parallel with the upper surface.

4. The optical-electric converting element of claim 3, wherein an included angle between the bottom surface and the sloped surface is about 45 degrees, an included angle between an optical axis of each first light-receiving coupling lens and the sloped surface is about 45 degrees, an included angle between an optical axis of each first light-emitting coupling lens and the sloped surface is also about 45 degrees, an included angle between an optical axis of each second light-receiving coupling lens and the sloped surface is about 45 degrees, and an included angle between an optical axis of each second light-emitting coupling lens and the sloped surface is also about 45 degrees.

5. The optical-electric converting element of claim 3, wherein the side surface defines a receiving cavity, the receiving cavity comprises a vertical surface substantially perpendicular to the upper surface, the at least one second light-emitting coupling lenses and at the least one second light-receiving coupling lens are formed on the vertical surface.

6. The optical-electric converting element of claim 5, further comprising two locating poles perpendicularly extending from the side surface, wherein the locating poles are symmetrical about the receiving cavity.

7. The optical-electric converting element of claim 1, wherein the at least one first light-receiving coupling lens and the at least first light-emitting coupling lenses are convex lenses and are integrally formed with the optical-electric coupling element.

8. The optical-electric converting element of claim 1, wherein the at least one second light-receiving coupling lens and the at least second light-emitting coupling lenses are convex lenses and are integrally formed with the optical-electric coupling element.

9. An optical-electric converting module, comprising:
   a printed circuit board (PCB) comprising a supporting surface, at least one laser diode and at least one photo diode, the at least one laser diode and the at least one photo diode positioned on the supporting surface and electrically connected to the PCB; and
   an optical-electric coupling element comprising:
      a lower surface defining a first cavity, a bottom portion of the first cavity forming at least one first light-receiving coupling lens and at least one first light-emitting coupling lens, a diameter of the at least one first light-receiving coupling lens being equal to d1, a diameter of the at least one first light-emitting coupling lenses being equal to d2, the optical-electric coupling element positioned on the supporting surface, with the at least one laser diodes and the at least one photo diode being received in the first cavity, each of at least one the first light-receiving coupling lens being aligned with a respective one of the at least one laser diode, and each of the at least one first light-emitting coupling lens being aligned with a respective one of the at least one photo diode; and
      a side surface perpendicularly connecting to the lower surface, the side surface forming at least one second light-receiving coupling lens and at least one second light-emitting coupling lens, a diameter of the at least one second light-emitting coupling lens being equal to d3, a diameter of the at least one second light-receiving coupling lens being equal to d4; wherein d1>d3 and d4>d2.

10. The optical-electric converting module of claim 9, wherein d1>d2 and d4>d3.

11. The optical-electric converting module of claim 9, wherein the optical-electric converting element comprises an upper surface substantially parallel with the lower surface, wherein the upper surface defines a second cavity, the second cavity comprises a bottom surface and a sloped surface directly connected to the bottom surface, and the bottom surface is substantially parallel with the upper surface.

12. The optical-electric converting module of claim 11, wherein an included angle between the bottom surface and the sloped surface is about 45 degrees, an included angle between an optical axis of each first light-receiving coupling lens and the sloped surface is about 45 degrees, an included angle between an optical axis of each first light-emitting coupling lens and the sloped surface is also about 45 degrees, an included angle between an optical axis of each second light-receiving coupling lens and the sloped surface is about 45 degrees, and an included angle between an optical axis of each second light-emitting coupling lens and the sloped surface is also about 45 degrees.

13. The optical-electric converting module of claim 11, wherein the side surface defines a receiving cavity, the receiving cavity comprises a vertical surface substantially perpendicular to the upper surface, and the at least one second light-emitting coupling lenses and at the least one second light-receiving coupling lens are formed on the vertical surface.

14. The optical-electric converting module of claim 13, wherein the optical-electric converting element comprises two locating poles perpendicularly extending from the first surface, and the locating poles are symmetrical about the receiving cavity.

15. The optical-electric converting module of claim 9, wherein the at least one first light-receiving coupling lens and the at least first light-emitting coupling lenses are convex lenses and are integrally formed with the optical-electric coupling element.

16. The optical-electric converting module of claim 9, comprising a driver chip, the drive chip received in the first cavity, the drive chip configured to drive the at least one laser diode to emit light and configured to the demodulation of data in the light received by the at least one photo diode.

* * * * *